United States Patent

[11] 3,622,538

| [72] | Inventor | David R. Green |
| | | Mt. Vernon, Ind. |
| [21] | Appl. No. | 851,439 |
| [22] | Filed | Aug. 19, 1969 |
| [45] | Patented | Nov. 23, 1971 |
| [73] | Assignee | General Electric Company |

[54] STABILIZED PIGMENTED POLYCARBONATE RESIN
4 Claims, No Drawings

[52] U.S. Cl. .................................................. 260/45.95, 260/45.7, 260/47, 260/77.5
[51] Int. Cl. .................................................. C08f 51/58
[50] Field of Search .......................................... 260/45.7, 45.95

[56] References Cited
UNITED STATES PATENTS

| 3,535,300 | 10/1970 | Gable ........................ | 260/45.95 |
| 3,305,520 | 2/1967 | Fritz et al. .................. | 260/45.7 |

*Primary Examiner*—Hosea E. Taylor
*Attorneys*—William F. Mufatti, Frank L. Neuhauser, Oscar B. Waddell and Joseph B. Forman ABSTRACT: An aromatic polycarbonate composition that is color stable, which composition consists of an aromatic polycarbonate resin having in admixture therewith 0.01–0.1 weight percent of an organic phosphite and 0.001–0.05 weight percent of glycerol, all of which are based on the weight of the aromatic polycarbonate resin.

STABILIZED PIGMENTED POLYCARBONATE RESIN

This invention is directed to a transparent tinted aromatic polycarbonate resin composition and in particular an aromatic polycarbonate resin containing therein an organic phosphite and glycerol.

In the art, many thermoplastic polymers require stability both in heat and color since such thermoplastic polymers per se are not generally stable. Many different additives have been found that are quite suitable for rendering thermoplastic polymers heat and color stable. Particularly useful are the phosphites which have been used to stabilize clear transparent aromatic polycarbonates. This has been disclosed in U.S. Pat. No. 3,305,520. In addition to phosphites, materials in combination with phosphites such as tetraaryl tin compounds disclosed by Canadian Pat. No. 727,700 have also been useful. While the phosphites alone have produced certain results in stability, it has now been surprisingly discovered that a particular material used in combination with an aromatic polycarbonate resin and a phosphite results in a resin having excellent heat and color stability.

Therefore, it is an object of this invention to provide a color stable aromatic polycarbonate composition.

Another object of this invention is to provide a color stable aromatic polycarbonate composition containing therein a phosphite and glycerol.

These and other objects of this invention will become apparent from the following detailed description thereof.

Briefly, according to this invention, the foregoing and other objects are attained by incorporating an aromatic polycarbonate resin, an organic phosphite and glycerol. Specifically, the composition comprises an aromatic polycarbonate resin having in admixture therewith 0.01–0.1 weight percent of an organic phosphite and 0.001–0.5 weight percent of glycerol based on the weight of the aromatic polycarbonate resin so employed. It has been found that by employing the combination of additives in admixture with an aromatic polycarbonate resin, the resin has excellent color and melt viscosity stability at elevated temperatures. For example, the polycarbonate resin does not discolor in the presence of titanium dioxide when the resin is molded into useful shapes or exposed to elevated temperatures. It has been found that the phosphite alone is not sufficient to stabilize pigmented polycarbonate resins against discoloration when exposed to elevated temperatures as during molding operations.

The following examples are set forth to illustrate more clearly the principle and practice of this invention to those skilled in the art. Unless otherwise specified, where parts or percents are mentioned, they are parts or percents by weight.

EXAMPLE I

A polycarbonate resin is prepared by reacting equimolar amounts of 2,2-bis(4-hydroxyphenyl)-propane (referred to as bisphenol-A) and phosgene, which preparation and polymer are disclosed in U.S. Pat. No. 3,028,365. The polycarbonate resin so prepared has an intrinsic viscosity of 0.52 as measured in dioxane at 30° C. The polycarbonate resin so prepared is blended with 0.025 weight percent of diphenyl decyl phosphite and varying amounts of glycerol as set forth in Table 1 in a laboratory mixer, dried at 250° F., and extruded into a strand which is comminuted into pellets. The pellets are then injection molded into test discs, 2 inches in diameter by one-eighth inches thick, and tested for yellowness in accordance with ASTM Yellowness Index Test D–1925–63T. The melt viscosity of the resin is also determined.

The amount of the additives employed with the polycarbonate resin as disclosed in table 1 is based on the weight of the polycarbonate resin. The test discs are tested for yellowness as molded and after 7 days exposure at 284° F. In each case, the yellowness test is run at room temperature. Melt viscosities are determined by heating the pellets to 600° F. for 20 minutes. The results are as follows:

TABLE 1

| % glycerol | 0 | 0.01 | 0.02 | 0.04 |
|---|---|---|---|---|
| Melt viscosity | 3,030 | 3,280 | 3,130 | 3,030 |
| Color as molded | | | | |
| 600° F. | 2.8 | 1.4 | 1.3 | 1.1 |
| 680° F. | 3.6 | 2.3 | 2.0 | 1.4 |
| Color after 7 days at 284° F. | | | | |
| 600° F. | 9.1 | 7.1 | 7.6 | 5.9 |
| 680° F. | 10.5 | 12.5 | 12.2 | 9.5 |

EXAMPLE II

Example I is repeated except that triisoctyl phosphite is employed herein instead of diphenyl decyl phosphite. The results are as follows:

TABLE 2

| % glycerol | 0 | 0.015 | 0 | 0.025 |
|---|---|---|---|---|
| % triisoctyl phosphite | 0.01 | 0.01 | 0.025 | 0.025 |
| Melt viscosity | 3,600 | 3,490 | 3,040 | 3,220 |
| Color as molded | | | | |
| 600° F. | 4.6 | 2.7 | 2.3 | 1.0 |
| 680° F. | 3.7 | 2.7 | 3.5 | 1.5 |
| Color after 7 days at 284° F. | | | | |
| 600° F. | 4.8 | 3.9 | 8.0 | 4.7 |
| 680° F. | 8.2 | 4.4 | 9.1 | 9.3 |

EXAMPLE III

Example I is repeated except that no organic phosphite is employed herein. The results are as follows:

TABLE 3

| % glycerol | 0 | 0.01 | 0.02 | 0.04 |
|---|---|---|---|---|
| Melt viscosity | 3,450 | 3,160 | 2,660 | 2,280 |
| Color as molded | | | | |
| 600° F. | 2.4 | 2.1 | 1.7 | 1.9 |
| 680° F. | 2.3 | 1.9 | 2.1 | 2.0 |
| Color after 7 days at 284° F. | | | | |
| 600° F. | 7.1 | 5.5 | 6.6 | 6.7 |
| 680° F. | 10.2 | 8.2 | 9.3 | 8.8 |

The Yellowness Index number is an indication of discoloration of the polycarbonate due to yellowness. The lower the number, the less is the yellowness of the polycarbonate resin due to discoloration. As shown from the examples, the use of glycerol with an organic phosphite reduces the yellowness of the polycarbonate resin as molded and after aging for 7 days at 140° C. as well as maintaining good melt viscosity of a polycarbonate resin. However, when employing glycerol alone without the organic phosphite, the melt viscosity of the polycarbonate resin is greatly diminished. Please note example III. This is significant since melt viscosity of a polymer is dependent on molecular weight and is therefore a measure of the mechanical properties. For example, a reduction in the melt viscosity of the polycarbonate resin by added ingredients is characteristically related to a lowering of mechanical properties such as notched impact strength, etc. Therefore, it is desirable to have the combination of advantages imparted to the polycarbonate while retaining the mechanical properties thereof. This is achieved by the unique combination of the additives disclosed herein. It is this combination that is the critical feature of the instant invention and not any one separately. The examples clearly show and emphasize this criticality.

The instant invention is directed to a stable aromatic carbonate polymer composition consisting of an aromatic carbonate polymer having in admixture therewith 0.001–0.05 weight percent of glycerol and 0.001–0.5 weight percent of an organic phosphite. The weight percents of the additives are all based on the weight of the polycarbonate resin. In addition, the composition described above is also resistant to degradation as shown by the melt viscosity in the examples. The addition of the organic phosphite greatly enhances the melt viscosity of the polycarbonate resin which is otherwise reduced through the use of the glycerol alone. The phosphite has an additive benefit in that it reduces the yellowness but the glycerol even causes a further reduction in the yellowness of a polycarbonate resin.

The expression "organic phosphite" as used herein is meant to embrace within its scope phosphites and mixtures of phosphites conforming to the following general formula:

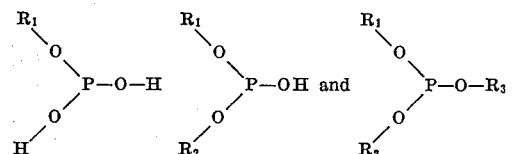

wherein $R_1$, $R_2$ and $R_3$ in each of the above formula represent organic alkyl, monocylic aromatic or cycloalkyl hydrocarbon radicals having from 1 to 25 carbon atoms. $R_1$, $R_2$ and $R_3$ may be the same or different. As exemplary of these phosphites, there are suggested the following: dibutyl phenyl phosphite, butylphosphite, diphenyl butylphosphite, diphenyl phosphite, triphenyl phosphite, hexyl phosphite, diheptyl phosphite, diphenylhexylphosphite, diphenyl nonyl phosphite, dinonylphosphite, diphenyl decyl phosphite, diphenyl dodecyl phosphite, didodecyl phosphite, 2-phenylethyl phenyl hexyl phosphite, 2-phenylethyl phosphite, di-2-phenyl methyl decyl phosphite, didecyl phenyl phosphite, di-2-ethyl decyl phenyl phosphite, tridecylphosphite, dicresyl decyl phosphite, di-(o-isooctylphenyl)-decyl phosphite, di-(dimethylphenyl) phenyl phosphite, trihexylphosphite, didecyl nonyl phosphite, di-(2-methyl-decyl)-cresyl phosphite, dicyclohexylphenyl phosphite, dicyclopentyl decyl phosphite, ditolyl decyl phosphite, tri-(p-t-octylphenyl)-phosphite, tri-(p-t-nonylphenyl)-phosphite, isobutyl dicresyl phosphite, etc. The preferred organic phosphites for use in the practice of the present invention are triphenylphosphite, diphenyldecyl phosphite and phenyl didecyl phosphite. The most preferred phosphite composition is a mixture of organic phosphites consisting of 1 part triphenyl- phosphite, 1 part phenyl didecyl phosphite and 2 parts diphenyl decyl phosphite.

The manner of dispersing or mixing organic phosphite and glycerol with the polycarbonate is not critical. However, the process chosen should be one which results in a great degree of dispersion of all the additives uniformly throughout the polycarbonate resin. Mixing of the material, for example, may be accomplished by methods normally employed for incorporation of material such as fillers and modifiers, etc., in any thermoplastic polymer. These methods include, for example, mixing rolls, ribbon blenders, dough mixers, Banbury mixers, extruders and other mixing equipment. The mixtures can then be formed or molded using compression molding, injection molding, calendering, or extrusion techniques. Generally, it is preferred to preblend the aromatic polycarbonate resin with the organic phosphite and glycerol in a blender. The mix is then fed to an extruder and extruded into a strand which is then comminuted into pellets. The pellets may then be employed for either compression molding, injection molding, etc.

However, it may be desirable to add the polycarbonate and additives by first dissolving both the phosphite, the glycerol and the polycarbonate in the common solvent such as methylene chloride and then evaporating the solvent to leave a residue of the phosphite and glycerol dispersed in the polycarbonate.

In general, any aromatic polycarbonate resin can be employed herein. Generally, the aromatic polycarbonates employed herein are polymers of dihydric phenols. The dihydric phenols that can be employed herein are bisphenols such as 1,1-bis(4-hydroxy phenyl)-methane, 2,2-bis(4-hydroxyphenyl)-propane, 2,2-bis(4-hydroxy-3-methylphenyl)-propane, 4,44-bis(4-hydroxyphenyl)-heptane, etc., dihydric phenol ethers such as bis(4-hydroxyphenyl)-ether, bis(3,5-dichloro-4-hydroxyphenyl, etc., dihydroxy diphenyl such as p,p'-dihydroxydiphenyl, 3,3'-dichloro-4,4'dihydroxydiphenyl, etc. dihydroxyaryl sulfones such as bis(4-hydroxyphenyl)-sulfone, bis(3,5 -dimethyl-4-hydroxyphenyl)-sufone, sulfone, bis(3-methyl-5-ethyl-4-hydroxylphenyl)-sulfone, etc., dihydroxy benzenes, resorcinol, hydroquinone, halo- and alkyl- substituted dihydroxy benzenes such as 1,4-dihydroxy-2-chloro benzene, 1,4-dihydroxy-2,3-dichlorobenzene, 1,4-dihydroxy-3-methylbenzene, etc., and dihydroxy diphenyl sulfoxides such as bis(4-hydroxyphenyl)-sulfoxide, bis(3,5-dibromo-4-hydroxyphenyl) sulfoxide, etc. A variety of additional dihydric phenols are also available to provide carbonate polymers and are disclosed in U.S. Pat. Nos. 2,999,835 and 3,028,365. It is of course possible to employ two or more different dihydric phenols or a copolymer of a dihydric phenol with glycol, a hydroxy or an acid terminated polyester, or a dibasic acid in the event a carbonate copolymer or interpolymer rather than a homopolymer is desired for use in the preparation of the aromatic carbonate polymers of this invention.

Generally, the polycarbonates employed herein may be prepared by reacting a dihydric phenol with a carbonate precursor in the presence of a molecular weight regulator and an acid acceptor. The carbonate precursors that can be used herein are either a carbonyl halide, a carbonate ester or a haloformate. The carbonyl halides which can be employed herein are carbonyl bromide, carbonyl chloride, carbonyl fluoride, etc. or mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonate, etc., di-(alkylphenyl) carbonates such as di-(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene is preferred.

As stated previously, the reaction may be carried out in the presence of an acid acceptor, which acid acceptor may be either an organic or an inorganic compound. A suitable organic acid acceptor is a tertiary amine and includes such materials as pyridine, triethylamine, dimethylaniline, tributylamine, etc. The inorganic acid acceptor may be one which can either be an hydroxide, a carbonate, a bicarbonate or a phosphate of an alkali or alkaline earth metal.

The molecular weight regulators which may also be employed in carrying out the process for preparing the aromatic polycarbonate resins can be such molecular weight regulators as phenol, cyclohexanol, methanol, paratertiarybutylphenol, parabromophenol, etc. Preferably, paratertiarybutylphenol is employed as the molecular weight regulator.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A stable aromatic carbonate polymer composition consisting of an aromatic carbonate polymer having in admixture therewith 0.001–0.05 weight percent of glycerol and 0.01–0.1 weight percent of an organic phosphite, all based on the weight of the carbonate polymer.

2. The composition of claim 1 wherein the organic phosphite is diphenyldecylphosphite.

3. The composition of claim 1 wherein the organic phosphite is a mixture of 1 part didecylphenylphosphite, 1 part triphenylphosphite and 2 parts diphenyldecylphosphite.

4. The composition of claim 1 wherein the aromatic carbonate polymer is the reaction product of bisphenol-A and phosgene, having the general formulas

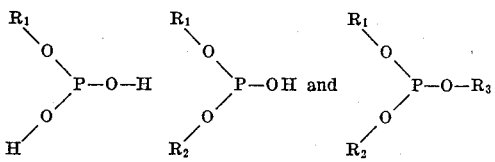

wherein $R_1$, $R_2$ and $R_n$ each represent alkyl, monocyclic aromatic or cycloalkyl hydrocarbon radicals having from one to 25 carbon atoms.

* * * * *

UNITED STATES PATENT OFFICE
CERTIFICATE OF CORRECTION

Patent No. 3,622,538          Dated 11/23/71

Inventor(s)    David R. Green

It is certified that error appears in the above-identified patent and that said Letters Patent are hereby corrected as shown below:

Claim 4, Line 8, after "phosgene",
. . . having the general formulas, delete the following:

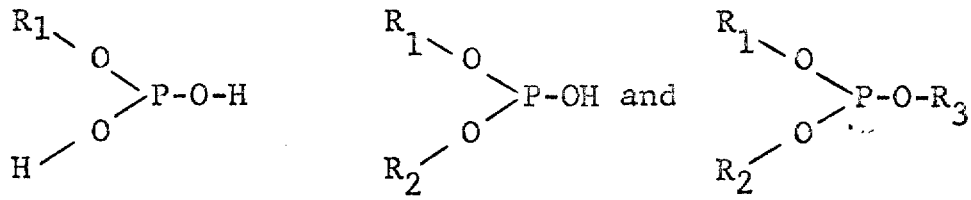

wherein $R_1$, $R_2$, and $R_3$ each represent alkyl, monocyclic aromatic or cycloalkyl hydrocarbon radicals having from one to 25 carbon atoms . . . .

Claim 4, Line 8, after "phosgene", insert a period (.).

Claim 1, Line 74, after "phosphite", insert the following:
. . . having the general formulas

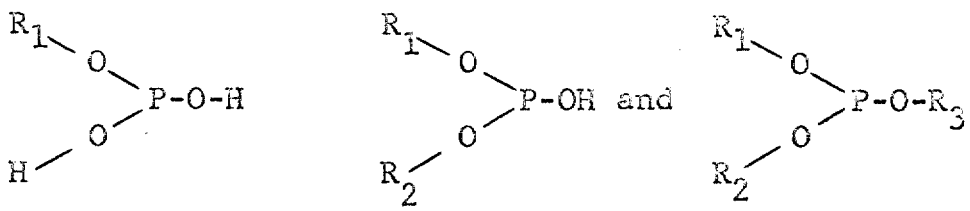

wherein $R_1$, $R_2$, and $R_3$ each represent alkyl, monocyclic aromatic or cycloalkyl hydrocarbon radicals having from one to 25 carbon atoms. . . . .

Signed and sealed this 23rd day of May 1972.

(SEAL)
Attest:

EDWARD M.FLETCHER,JR.            ROBERT GOTTSCHALK
Attesting Officer                Commissioner of Patents